United States Patent
Maisuradze et al.

(10) Patent No.: US 8,031,277 B2
(45) Date of Patent: Oct. 4, 2011

(54) METHOD AND DEVICE FOR REGULATION AND CONTROL OF TRANSPARENCE AND TRANSLUCENCE OF GLAZING OR OILCLOTH

(75) Inventors: Nodar Maisuradze, Tibilisi (GE); Elgudja Zhgenti, Tbilisi (GE); Ivane Bakradze, Tbilisi (GE)

(73) Assignee: Nodar Maisuradze, Tbilisi (GE)

( * ) Notice: Subject to any disclaimer, the term of this patent is extended or adjusted under 35 U.S.C. 154(b) by 633 days.

(21) Appl. No.: 11/670,777

(22) Filed: Feb. 2, 2007

(65) Prior Publication Data

US 2007/0242174 A1    Oct. 18, 2007

Related U.S. Application Data

(63) Continuation of application No. PCT/GE2004/000003, filed on Jul. 23, 2004.

(30) Foreign Application Priority Data

Jul. 14, 2004  (GE) .......................... AP 2004 005575

(51) Int. Cl.
*G02F 1/1333* (2006.01)
(52) U.S. Cl. ........................................ 349/16
(58) Field of Classification Search ............ 349/16
See application file for complete search history.

(56) References Cited

U.S. PATENT DOCUMENTS

| | | | |
|---|---|---|---|
| 3,895,859 A | 7/1975 | Yoshida et al. | |
| 4,475,031 A * | 10/1984 | Mockovciak, Jr. | 250/214 SG |
| 4,786,784 A | 11/1988 | Nikodem et al. | |
| 5,384,653 A * | 1/1995 | Benson et al. | 359/270 |
| 5,409,734 A | 4/1995 | Lee et al. | |
| 5,576,859 A | 11/1996 | Castleberry | |
| 5,903,247 A * | 5/1999 | Howard et al. | 345/87 |
| 6,300,018 B1 | 10/2001 | Dilley et al. | |
| 2003/0137715 A1 | 7/2003 | Pool et al. | |
| 2003/0210355 A1 * | 11/2003 | Dao | 349/16 |

FOREIGN PATENT DOCUMENTS

| | | |
|---|---|---|
| CN | 1279410 A | 1/2001 |
| CN | 1312667 A | 9/2001 |
| DE | 3420730 | 5/1985 |
| EP | 0328329 A2 | 8/1989 |
| EP | 0372356 A2 | 6/1990 |
| EP | 0499642 A1 | 8/1992 |
| EP | 0709712 A2 | 5/1996 |
| EP | 0773706 A2 | 5/1997 |
| EP | 1132981 A2 | 9/2001 |
| GB | 845053 | 8/1960 |
| GB | 1110406 | 4/1968 |

(Continued)

*Primary Examiner* — Thanh-Nhan Nguyen
(74) *Attorney, Agent, or Firm* — Gerry J. Elman; Elman Technology Law, P.C.

(57) ABSTRACT

The claimed inventions are intended to be used in glazing of buildings and vehicles. The effect consists in power input savings and in creating ability of a self-contained power supply source. The method for regulation of translucence of glazing or transparent or translucent oilcloth, envisaging power supply of including as their component at least one current conductor film with adjoining to it liquid crystalline layer and regulation of voltage is characterized by regulation of voltage of constant current within the limits of 12 volts or of frequency of alternating current. The device may contain an autonomous constant power supply source provided with a heliopower battery and mounted or built in the glazing or oilcloth and/or with a microprocessor regulator of frequency or voltage.

6 Claims, 1 Drawing Sheet

FOREIGN PATENT DOCUMENTS

| | | |
|---|---|---|
| GB | 1496559 | 12/1977 |
| SU | 412363 | 1/1974 |
| SU | 666267 | 6/1979 |
| SU | 800335 | 1/1981 |
| SU | 1167045 A | 7/1985 |
| WO | 2004/049047 A1 | 6/2004 |

* cited by examiner

US 8,031,277 B2

METHOD AND DEVICE FOR REGULATION AND CONTROL OF TRANSPARENCE AND TRANSLUCENCE OF GLAZING OR OILCLOTH

TECHNICAL FIELD

The present invention relates to the field of engineering and can be applied to windows and doors of buildings and structures and for windows of vehicles. The inventive "oilcloth," being a flexible, transparent or translucent and film-like, mainly thin article, has qualities of flexibility (like a flipper or swim fin) and being suitable to be applied over the existing glazing of windows of buildings and other structures or to the glasses of transportation vehicles.

TERMINOLOGY

By speaking of the "regulation" of "translucence," we refer to regulation of the amount of light that passes through an article of the present invention. If the light is not substantially diffused, the article appears transparent, so the effect may be described as transparence as well as translucence. If the light is substantially diffused, we describe the effect as translucence.

By "oilcloth" we mean a flexible, translucent, film-like, mainly-thin article. The "oilcloth" may desirably also be transparent.

By "meander" we mean following a continuously variable course rather than a stepped course.

BACKGROUND ART

The glasses called "chameleons" or "photochromic," having the property of changing their transparence/translucence smoothly under the influence of the solar radiation, are well known. Their drawback is their sluggishness (i.e. the slow course of the process) and their uncontrollability on the part of the user.

"The Transmitted Light Intensity Controllable Window" (Application EP0709712, published 1 May 1996, in Bulletin 1996/18) and the method of transparence (or translucence) control used therein is known in the art. Therein the property of originally transparent liquid crystalline polymer to reorientate and instantly (or quickly enough) become opaque under the application of electric potential is used. However, the said device and the method used therein provide only for switching the item from transparent to opaque without permitting translucence regulation over a range.

"The Electrically Controllable Optical Element" (United Kingdom Patent GB845053, published 17 Aug. 1960) and the method of transparence (or translucence) regulation and control used therein is known in the art. The said element contains several layers with controllable switching from transparent to opaque, positioned against each other and each consisting of a glass, a current conductor film and an optical filter.

Transparence/translucence can be regulated by means of application of electrical potential to the layers by turns and their switching. However this regulation is not smooth. The said method and device provide only for several gradations of transparence/translucence.

From the viewpoint of technical essence and achieved result, the most similar to the present inventions is the "Protection Device from Solar Radiation" (Author's Certificate of the USSR No. 666267, published 5 Jun. 1979, in Bulletin No 21) and the transparence/translucence regulation method embodied therein, chosen as a prototype.

The prototype contains glazing made of two rows of glasses, transparent current conductor coatings (films), a layer of liquid crystal, adjoining to the current conductor films and filling in the gap between the glasses and a power supply source. To achieve at least several gradations of translucence, i.e. several values of the quantity of light passing through all glazing, the method of dimming-out of some sections out of the whole glazing area is used in the said device. With this aim, the glazing is divided into several sections wherein electrical potential is applied separately and can be switched optionally, or several sections can be switched on together. Thereby, regulation of light having passed through all glazing is achieved, while by means of a toggle switch, for example, an upper or lower side screen of a window can be dimmed out instantly (in a second), or several dimmed out and light sections can be combined, or the glazing can be dimmed out completely by dimming out all sections. Herein each section has only two positions of translucence—transparent and opaque. Glazing translucence and quantity of incoming light is controlled by a user by switching and combining of the position of the toggle switch of the power supply source connected to the glazing and the power supply source.

The drawbacks of the prototype are low operating characteristics, caused by impossibility of smooth or almost smooth, i.e. fine stepped (for example, meander, imperceptible for visual apprehension) regulation of glazing translucence and incoming light, while transparence of glazing, precisely of its separate sections, is not regulated at all. It is also a drawback that, for example, if a user wants to make what is happening indoors or in a car body invisible from the outside so that to have enough daylight, he will have either to dim out all glazing sections thus darkening completely and blocking incoming light, or not to dim out some glazing sections, then therefrom an interior or a car body will be seen all the same. Inconvenience and complexity of translucence control and impossibility of transparence control over the property range of an applied liquid crystalline material from maximum transparent to maximum opaque is also a drawback. This inconvenience is especially undesirable if such glazing is applied to cars, because the necessity to make complex procedures to achieve desirable transparence and car body illumination will prevent a driver from running a car. It is also a drawback that the method and the construction don't envisage possibility of remote regulation and control and autonomous power supply. This drawback is especially a problem when such glazing or oilcloth is applied to buildings, particularly to large ones.

AIM OF THE INVENTION

The present inventive conception is aimed at solution of the task of simultaneous maintenance of non-stepped (i.e. smooth or meander) regulation (i.e. fine-stepped, being imperceptible for visual apprehension due to a meander discretion) of translucence of a mainly-thin article such as window glazing or oilcloth, with the aim of improving operating characteristics, thereby widening functional possibilities, providing for maximum comfort of control for a user, making autonomous power supply possible and saving power inputs.

DISCLOSURE OF THE INVENTION

For achievement of the said technical results, the method for regulation of translucence of an article such as glazing or oilcloth, envisaging a power supply including as a component at least one current conductor film with adjoining to it, a liquid crystalline layer, and regulation of applied electrical field according to the present invention, envisages the following distinguishing essential features: regulation of voltage of direct current within the limits of 12 volts or of voltage and/or frequency of alternating current.

For achievement of the said technical results, the device for regulation of transparence/translucence of glazing or oilcloth containing an autonomous power supply source includes as a component at least one current conductor film with adjoining to it a liquid crystalline layer, according to the present invention, has the following distinguishing essential features: it is provided with a heliopower (solar powered) battery attached to the autonomous power supply source and mounted or built in the glazing or oilcloth and/or with a microprocessor regulator of frequency.

There is the following cause-effect connection between the distinctive features and the technical results: provision of the construction with a microprocessor regulator of voltage or frequency of the supplied power provides for essentially non-stepped (i.e. smooth or meander, or at least imperceptibly fine-stepped) regulation of voltage or frequency of the supplied power current, consequently corresponding essentially non-stepped changing of transparence/translucence of the liquid crystalline layer adjacent to the current conductor film is provided. This property of liquid crystalline polymers is well known in the background art (for example, "Liquid Crystalline Polymers" by A. V. Volokhina et al, in "Chemistry," edited by N. A. Plata, Moscow, 1988).

After removal of voltage (potential), i.e. after switching off power supply, the liquid crystalline layer becomes completely transparent, while with power supply and regulation of voltage from zero to maximum or current frequency to maximum envisaged rated, the liquid crystalline layer gradually becomes maximum opaque and light-tight. As a result, over the range from transparent to opaque, any value of translucence can be achieved, consequently both operating and aesthetic characteristics of glazing or oilcloth are raised and functional possibilities are widened.

Provision of an ultraviolet, infrared or ultrasound detector and a remote control unit provide for maximum comfort for a user, because adjustment of a glazing or an oilcloth to a desirable value of transparence/translucence is remotely made by means of pressing a button and keeping it pressed until the desirable amount or level of transparence/translucence is achieved. Provision of a heliopower battery wherewith a supplying storage-cell or a battery is recharged, makes a glazing or an oilcloth independent and autonomous from the external power network.

EMBODIMENTS OF THE INVENTION

Figure 1:
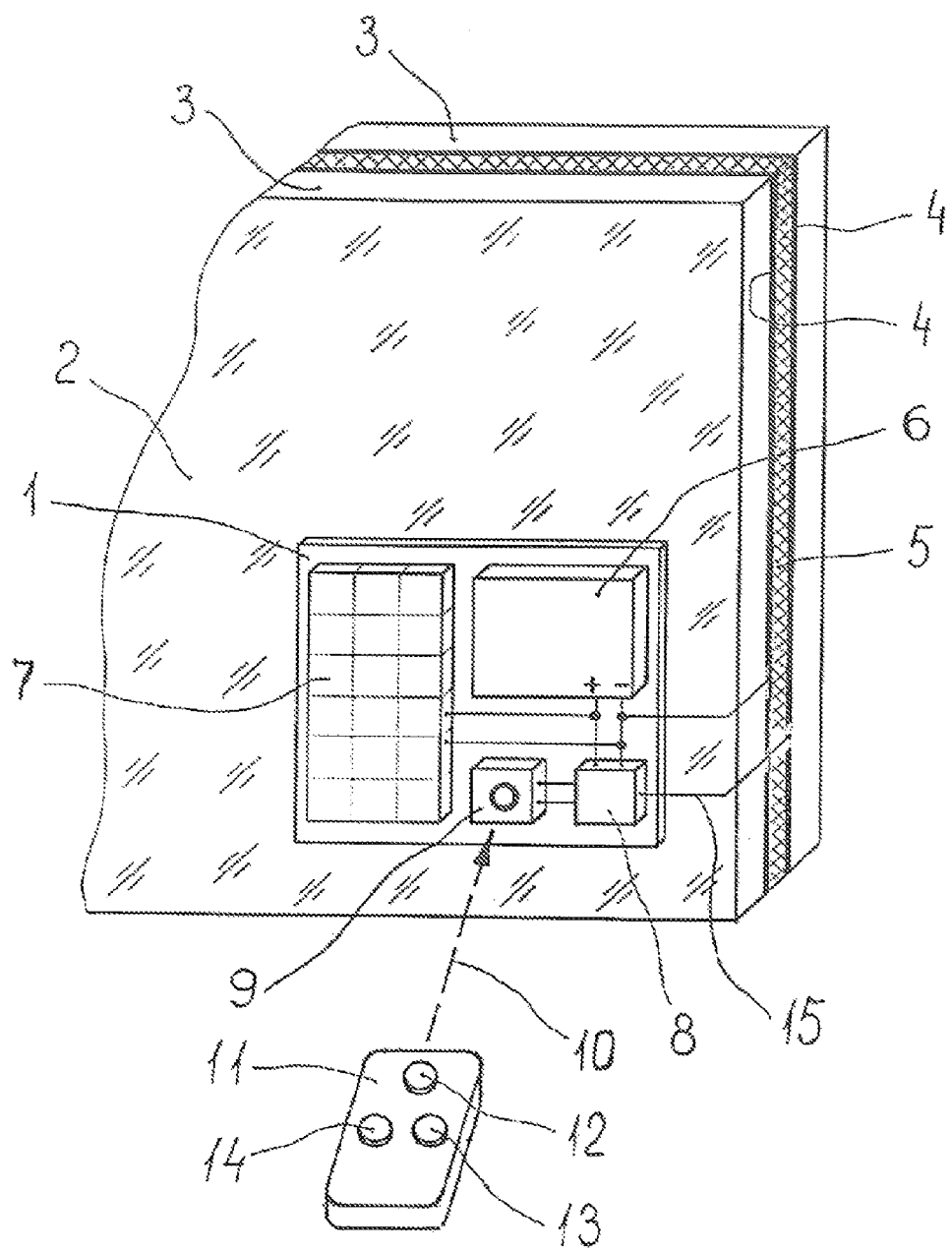
FIG. 1 is a diagrammatic, perspective, fragmentary view of an embodiment of the present invention

The essence of the invention is disclosed by means of FIG. 1, wherein a fragment of a glazing or a flexible oilcloth with a remote control device and a simplified circuit scheme is represented, wherein the present method for regulation of transparence or translucence of glazing or oilcloth is realized—it is the best embodiment of the present invention from the viewpoint of the present inventors.

Applicants hereby incorporate by reference the entire disclosure of their published International Patent Application WO 2006/005968 A1 with International Search Report and, to the extent not inconsistent with the present teachings, the disclosure of each of the references cited anywhere therein and herein.

The inventive device for regulation of transparence and translucence of glazing or oilcloth contains substrate 1, fixed on or adhered to the glazing or oilcloth 2. The glazing or oilcloth 2 comprises, for example, two silicate or organic glasses or thin flexible polymer films 3. On the surface of glasses or films 3 of the oilcloth 2, transparent current conductor layer 4 of electrically conducting material, for example, "β" tin dioxide, is applied as a thin film (about 0.1-1 mkm, i.e., mkm=micrometer). Between the glasses 3, a liquid crystalline layer 5 adjoining to the current conductor layers (films) 4 of the thickness (width) of about 5-100 mkm is enclosed. On the substrate 1, a storage cell or a battery 6 of constant current, connect it with its recharging heliopower (i.e. solar powered) battery 7 and a microprocessor switch and/or a regulator 8 of direct current voltage or alternating current voltage and/or frequency, connected with the storage cell 6 are situated.

The microprocessor switch and/or the regulator 8 is programmed for a desired pattern (non-stepped or meander) of regulation of current voltage or frequency. In an embodiment of the device intended for supplying to consumers, the storage cell 6 and the heliopower battery 7 would typically be omitted. The storage cell 6 and the heliopower battery 7 may also be omitted when applying the present invention to transport, because therein a vehicle-borne power supply is typically present and may be used to power the present device.

On the substrate 1 an ultraviolet, infrared or ultrasound detector 9, connected with microprocessor regulator 8 is also fixed, being positioned so as to perceive control signals according to arrow 10 from an ultraviolet, infrared or ultrasound remote control unit 11. On the unit 11, one button 12 of a switch and two other buttons are situated. Button 13 is for raising voltage and/or frequency and button 14 is for their reduction over the envisaged range. One terminal of the storage cell 6 is connected to one of the current conductor films 4. The other terminal, through the microprocessor regulator 8 of voltage and/or frequency, is connected with the other current conductor film 4 by means of the current conductors 15. When applying the present invention, for example, to motor transport, the ultraviolet, infrared or ultrasound detector 9 and correspondingly the remote control unit 11, may be absent; instead a manual control (not shown) of the microprocessor regulator 8 would be provided.

The present device for regulation of transparence/translucence of glazing or oilcloth operates in the following manner.

Let's assume that originally the glazing is not under applied voltage; consequently it's completely transparent. When a user presses the button 12 of the remote control unit 11, an ultraviolet, infrared or ultrasound signal is transmitted to the detector 9 according to the arrow 10, the device is switched on and voltage may be supplied. Then by means of pressing and keeping pressed the button 13, the voltage and/or frequency regulator 8 is controlled through the detector 9, and voltage is supplied to the current conductor film 4 from the storage battery 6. Electric field influences the liquid crystalline layer 5, situated between the current conductor films 4 of the glasses 3, and the liquid crystalline layer 5 will begin to reorientate and darken gradually. After a user releases the button 13, the liquid crystalline layer 5 will darken to a desired (from completely transparent to maximum opaque) level of translucence/transparence of the glazing 2. Wherewith the glazing 2 remains under the fixed current voltage and/or frequency, and the achieved level of transparence/translucence is maintained while there is sufficient energy in the storage battery 6.

For the reverse, illumination, i.e. for increasing transparence/translucence of the glazing of oilcloth 2, the user has to press and keep pressed the button 14 to desirable translucence, whereafter with repeated pressing of the button of the switch 12, voltage, i.e. electrical potential, is fully removed from the current conductor films 4, the liquid crystalline layer 5 reorientates back, and glazing or oilcloth 2 becomes completely transparent. Whereupon the energy of the storage battery 6 is not wasted, while in the daylight the heliopower battery 7 continues to recharge the storage cell 6 gradually. For provision of this process and maintenance of necessary transparence/translucence of the liquid crystalline layer 5 and glazing or oilcloth 2, very little energy is spent, practically the energy of small storage batteries is sufficient, the constructive dimensions and the clearance of the present devices are also small. Thereby the latter can either be mounted on, or adhered into glazing or oilcloth, or installed autonomously from them.

The present inventors have manufactured models of the devices and glazing for regulation and control in accordance with the present invention, wherein the method corresponding to the claimed invention is realized. The efficiency is proved and all above-mentioned technical results are achieved.

The invention claimed is:

1. A device for regulation of translucence of glazing or oilcloth, comprising at least two current conductor films and a liquid crystalline layer placed between and adjoining said at least two current conductor films, comprising a power supply source connected to one of the said current conductor films and a microprocessor regulator of frequency of the alternating current or voltage of the direct current, connected to the other of the said current conductor films and to the power supply source, and a remote control unit connected to the microprocessor regulator wherein the said device is provided with a solar panel mounted on a common base with the microprocessor regulator, remote control unit, and power supply source, wherein the power supply source comprises a rechargeable storage battery, wherein the microprocessor regulator is programmed for stepless or meander regulation of changes of frequency of the alternating current or voltage of the direct current in response to commands from the remote control unit.

2. The device of claim 1, wherein the common base is secured on the surface of glazing or oilcloth.

3. The device of claim 1, wherein the common base is secured inside glazing or oilcloth.

4. The device of claim 1, wherein the microprocessor regulator is programmed for stepless or meander regulation of changes of voltage of the direct current within 12V.

5. The device of claim 1, wherein the solar panel is electrically connected to the microprocessor regulator.

6. The device of claim 1, wherein the solar panel is electrically connected to the rechargeable storage battery.

* * * * *